US008078666B1

(12) United States Patent
Stewart et al.

(10) Patent No.: US 8,078,666 B1
(45) Date of Patent: *Dec. 13, 2011

(54) DISTRIBUTED REPORT PROCESSING SYSTEM AND METHODS

(75) Inventors: Robert S. Stewart, Pittsburgh, PA (US); Roland E. Collins, III, Ardmore, PA (US)

(73) Assignee: Reportedge, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/073,564

(22) Filed: Mar. 28, 2011

Related U.S. Application Data

(63) Continuation of application No. 12/478,212, filed on Jun. 4, 2009, now Pat. No. 7,917,575, which is a continuation of application No. 09/949,304, filed on Sep. 7, 2001, now Pat. No. 7,565,394.

(60) Provisional application No. 60/230,748, filed on Sep. 7, 2000.

(51) Int. Cl.
*G06F 15/16* (2006.01)
*G06F 17/00* (2006.01)
(52) U.S. Cl. ......... 709/201; 709/203; 715/234; 715/273
(58) Field of Classification Search .................. 709/201, 709/203; 715/234, 273
See application file for complete search history.

*Primary Examiner* — Ranodhi Serrao
(74) *Attorney, Agent, or Firm* — K&L Gates LLP

(57) ABSTRACT

A distributed report processing system. The system includes a management server and a queue server in communication with the management server. The system also includes a plurality of report generators in communication with the management server and the queue server.

18 Claims, 14 Drawing Sheets

REQUEST STORAGE 1600

| REQUEST ID # 1630 | REPORT ID # 1635 | USER ID # 1640 | NEXT RUN DATE 1645 |
|---|---|---|---|
| 1605 00001 | 001 | 0103 | 12/31/2000 |
| 1610 00001 | 002 | 0103 | 12/31/2000 |
| 1615 00002 | 001 | 0199 | 09/30/2000 |
| 1620 00003 | 001 | 0075 | 12/31/2000 |
| 1625 00003 | 001 | 0075 | 12/31/2000 |

| RUN-TIME PARMETERS 1650 | REPORT PACKAGENAME 1655 |
|---|---|
| SHOWGRAPH=Y,FOOTER=N,TOC=Y,ACCT=A35 | JOE SMITH EOY REPORTS |
| SHOWGRAPH=Y,FOOTER=N,TOC=Y,ACCT=A35 | JOE SMITH EOY REPORTS |
| SHOWGRAPH=N,FOOTER=N,TOC=N,ACCT=B29 | BOB JONES SUMMARY |
| SHOWGRAPH=Y,FOOTER=N,TOC=Y,ACCT=C03 | DOE FAMILY REPORTS |
| SHOWGRAPH=Y,FOOTER=N,TOC=Y,ACCT=C04 | DOE FAMILY REPORTS |

FIG. 13

REPORT PACKAGE STORAGE 1700

| | PACKAGE ID # 1730 | CREATION DATE 1735 | USER ID # 1740 | NAME 1745 |
|---|---|---|---|---|
| 1705 | 00001 | 06/30/2000 | 0103 | JOE SMITH QUARTERLY REPORTS |
| 1710 | 00002 | 06/30/2000 | 0103 | BOB JONES QUARTERLY REPORTS |
| 1715 | 00003 | 08/31/20000 | 0199 | BOB JONES MONTHLY SUMMARY |
| 1720 | 00003 | 12/31/1999 | 0075 | JOHN DOE EOY REPORTS |
| 1725 | 00003 | 12/31/99 | 0968 | BURT HOOVIS EOY REPORTS |

| FILE LOCATION 1750 |
|---|
| E:\REPORTOUTPUT\0103\06302000100020.PDF |
| E:\REPORTOUTPUT\0103\06302000100021.PDF |
| E:\REPORTOUTPUT\0199\08312000100003.PDF |
| E:\REPORTOUTPUT\0075\12311999100056.PDF |
| E:\REPORTOUTPUT\0968\12311999100987.PDF |

FIG. 14

DISTRIBUTED REPORT PROCESSING SYSTEM AND METHODS

CROSS-REFERENCE TO RELATED APPLICATIONS/PRIORITY CLAIM

The present patent application is a continuation of U.S. patent application Ser. No. 12/478,212, filed on Jun. 4, 2009, now issued as U.S. Pat. No. 7,917,575, which is a continuation of U.S. patent application Ser. No. 09/949,304, filed on Sep. 7, 2001, now issued as U.S. Pat. No. 7,565,394, which claims priority from provisional application Ser. No. 60/230, 748 filed Sep. 7, 2000, each of which are hereby incorporated by reference in their entirety into the present application.

BACKGROUND OF THE INVENTION

Businesses and organizations produce periodic report packages for customers, executives, investors, business partners and others. In most cases, the report packages are to be produced as quickly as possible after the underlying data are available. When multiple reports are produced from automated systems, however, they are produced in sequential order which requires time proportionate to the number of reports, accounts or records used to create the reports. In addition, if reports from multiple electronic data sources are included in a package, they are often compiled manually, requiring additional time.

In addition to periodic reports, multiple users may request multiple reports to be generated on demand through online systems. These multiple requests are also processed in sequential order, requiring time proportionate to the number of requests, reports, accounts or records used to create the reports, delaying the creation of reports for users whose requests were later in the queue.

As apparent from the above deficiencies with conventional systems for producing report packages, a need exists for a system that can distribute the creation of multiple reports across multiple processors, working in parallel, to shorten the time required to produce high volumes of reports or respond to on-demand requests from users. A further need exists for a system that can create reports from multiple electronic data sources, using multiple processors, and automatically combine the resulting reports into a report package.

SUMMARY OF THE INVENTION

The present invention is directed to a distributed report processing system. The system includes a management server and a queue server in communication with the management server. The system also includes a plurality of report generators in communication with the management server and the queue server.

The invention has the advantage that it allows for report generation to be done in a parallel manner to save time and system resources. The present invention also has the advantage that it allows multiple users to request that reports be generated simultaneously using distributed processing. The present invention has the further advantage that it allows for reports to be returned to the requesting user(s) or to be stored for later retrieval.

BRIEF DESCRIPTION OF THE DRAWINGS

For the present invention to be clearly understood and readily practiced, the present invention will be described in conjunction with the following figures, wherein:

FIG. 13 illustrates a sample request storage table from the database on the DRPS management server 300; and FIG. 14 illustrates a sample report package storage table from the database on the DRPS management server 300.

DETAILED DESCRIPTION OF THE PREFERRED EMBODIMENTS

Figure 1:
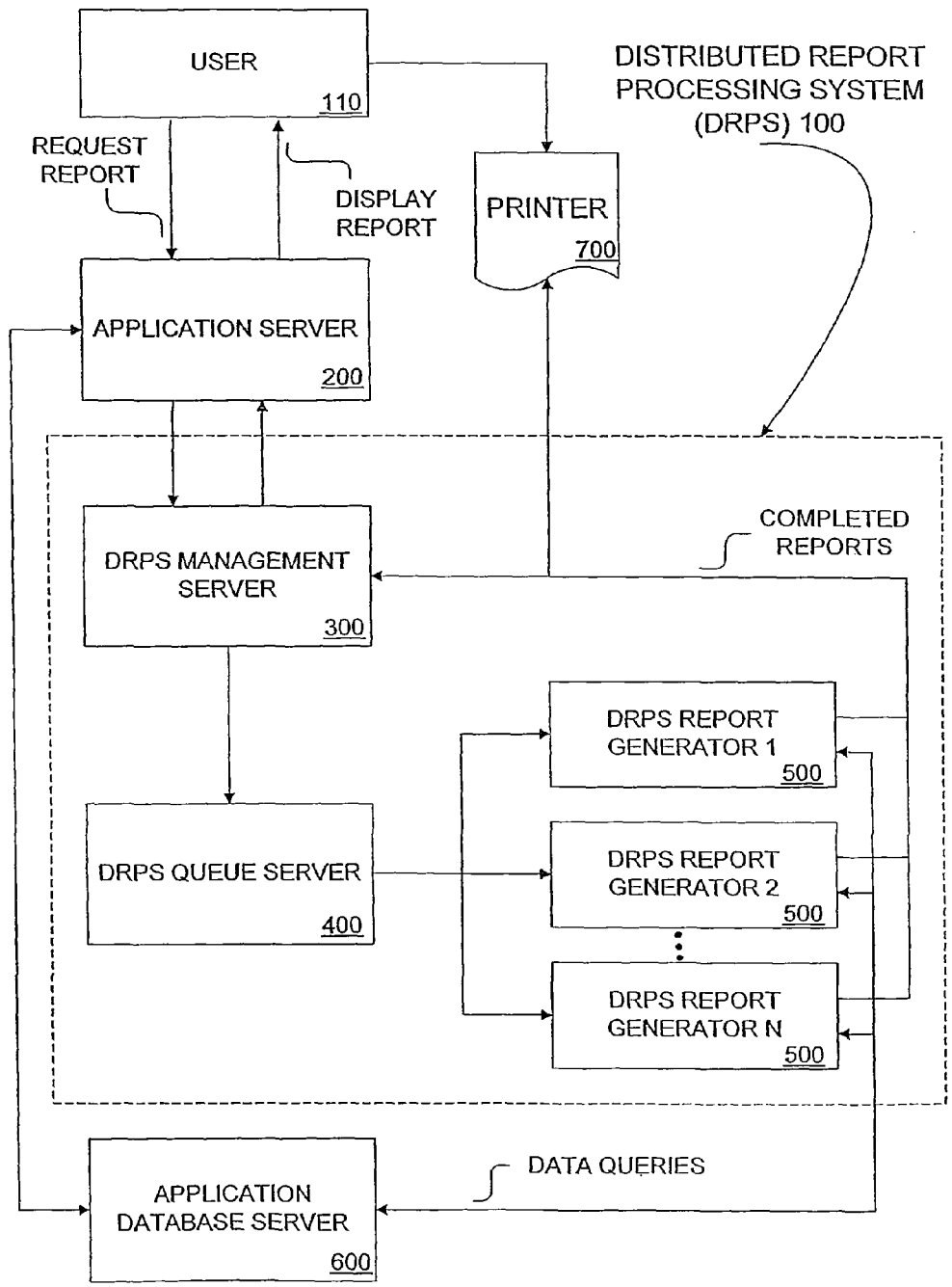
FIG. 1 is a schematic block diagram illustrating a distributed report processing system (DRPS) 100 in accordance with one embodiment of the present invention.

FIG. 1 shows an embodiment of a distributed report processing system (DRPS) 100 that handles report and report package requests from multiple application users, hereinafter collectively referred to as user 110, and creates the reports in parallel mode using multiple report generators 500. The reports and report packages are returned to user 110 for display or printing or sent directly to a printer 700.

User 110 submits a request through an electronic device, such as, for example, a personal computer (not shown) connected to a network (not shown) that is connected to an application server 200. User 110 is thus connected to the application server 200 and is also connected to the DRPS 100 over a network such as, for example, a private network, a public switched telephone network (PSTN) or other network using communications links between nodes, such as a cable, fiber or wireless link on which electronic signals can propagate.

Through the application server 200, in combination with the DRPS 100, user 110 can request one report or a package of reports using data from an application database server 600. An alternate embodiment enables user 110 to set up multiple reports and report packages, including report parameters and future calendar dates on which the reports are scheduled to automatically run. The reports, parameters and dates are stored on a DRPS management server 300.

The report requests from user 110 are transmitted from the application server 200 to the DRPS management server 300 to create individual requests. The requests are forwarded to a DRPS queue server 400 that handles the distribution of requests in the queue to multiple DRPS report generators 500, which is a collective representation of one or more DRPS report generators. The DRPS report generators 500 work in parallel to generate reports simultaneously and continuously until the items in the queue on the DRPS queue server 400 are completed.

The report output from the DRPS report generators 500 may be output as, for example, a single report or multiple reports combined into a report package. The report output is also formatted for the display mode or print mode specified in a parameters file stored on the DRPS management server 300 and is sent back to user 110 for display or to the printer 700 for output on printed media.

As an example, a user 110 using a portfolio management application can request a 5-report package to be generated for a specific account on the system. The request is passed to the DRPS 100, which generates the five reports simultaneously using five DRPS report generators 500. The reports are packaged as one file and are output into a file format that may be displayed and printed by the user. Because the report requests were distributed to multiple report generators 500 simultaneously, the entire report package was generated in a fraction of the time that it would have taken utilizing a single-threaded report generator system.

The DRPS 100 can be utilized to generate reports for any application, in an online or batch mode. In one embodiment, a DRPS 100 can be configured to respond to individual online requests from multiple users 110 over a network. In an alternate embodiment, a DRPS 100 can be configured to process several hundred thousand month-end reports for which the parameter files are pre-configured and scheduled to run automatically.

Distributed Report Processing System

Figure 3:
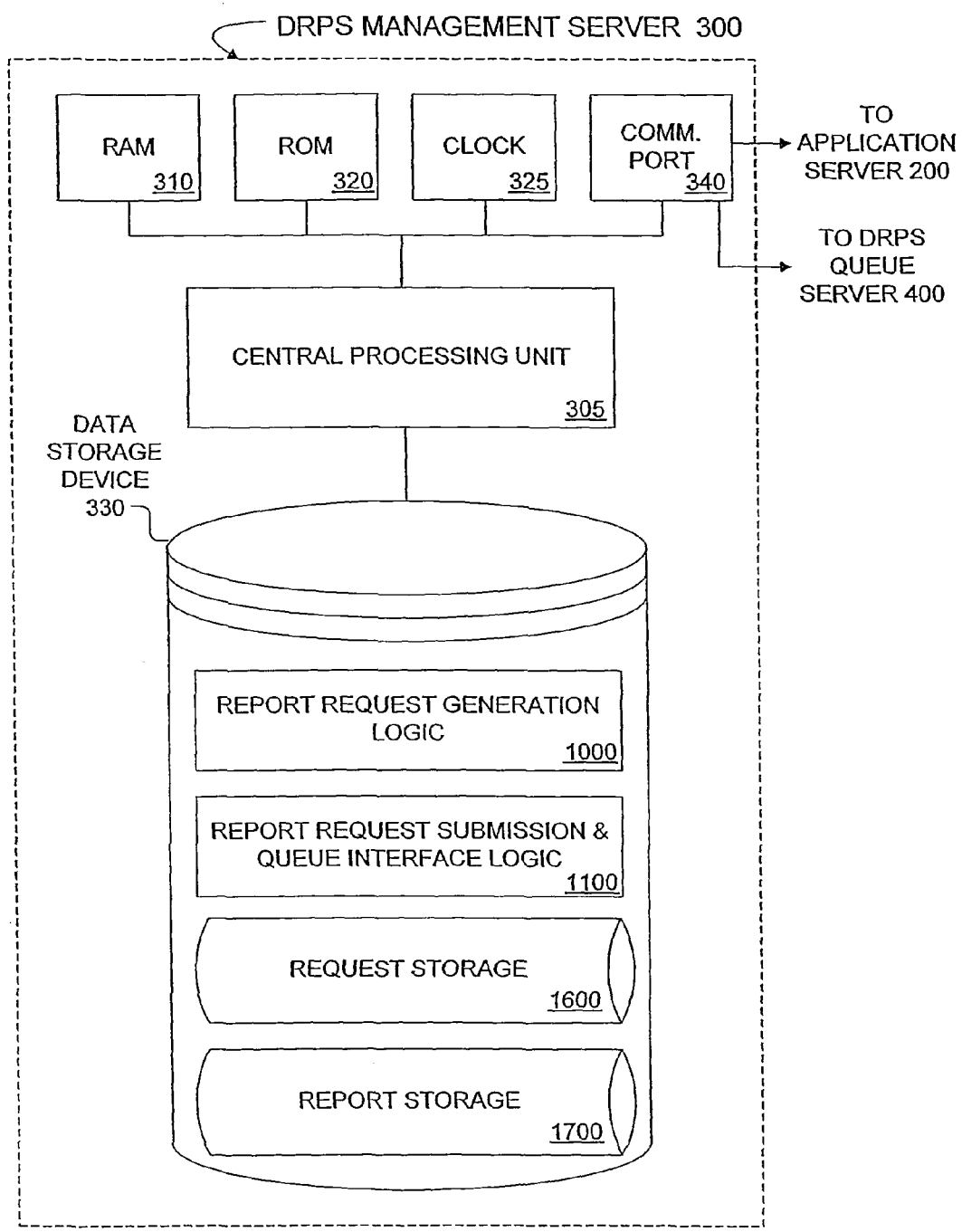
FIG. 3 is a schematic block diagram of an embodiment of the DRPS management server 300 of FIG. 1.
Figure 4:
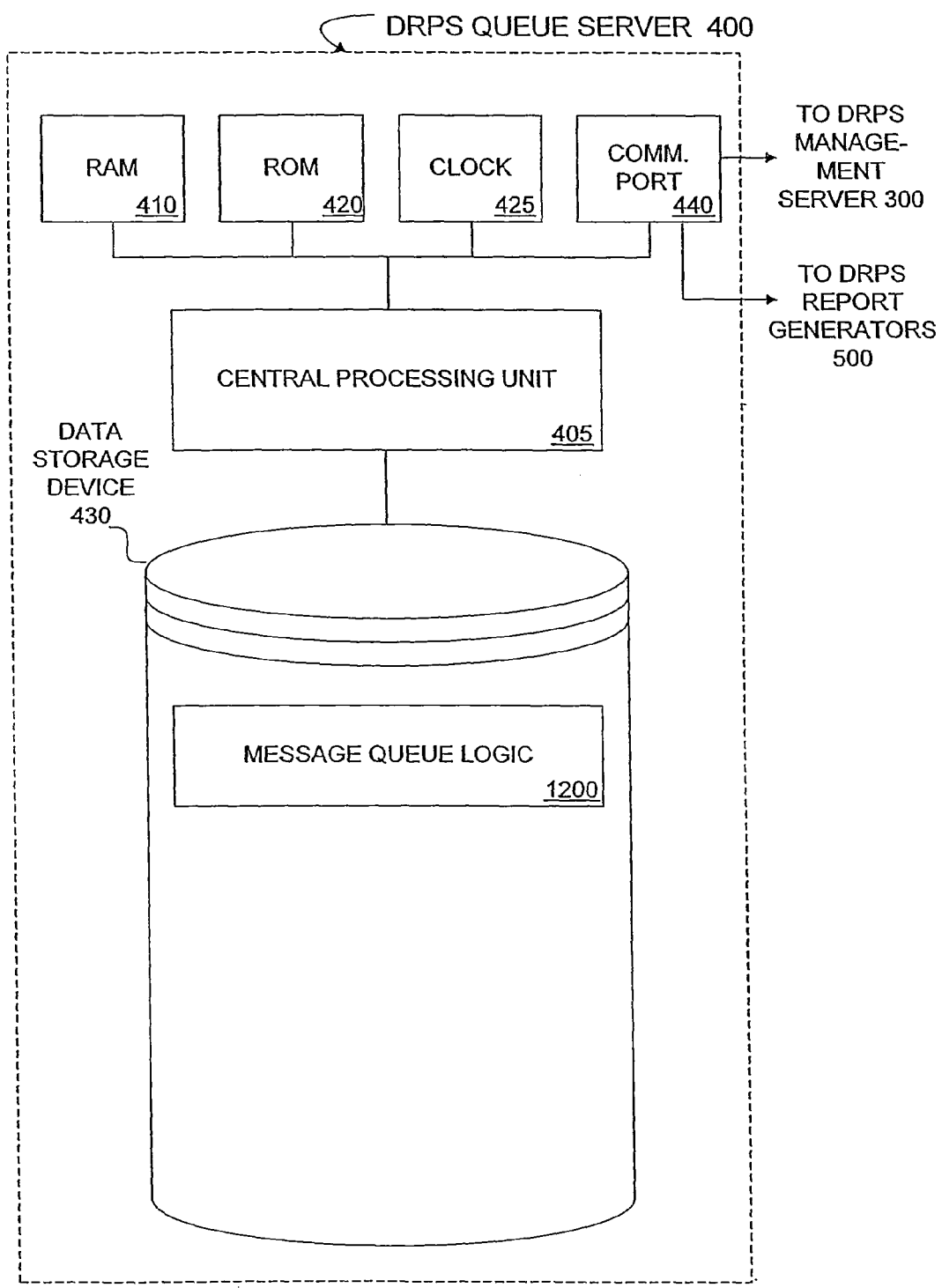
FIG. 4 is a schematic block diagram of an embodiment of the DRPS queue server 400 of FIG. 1.
Figure 5:
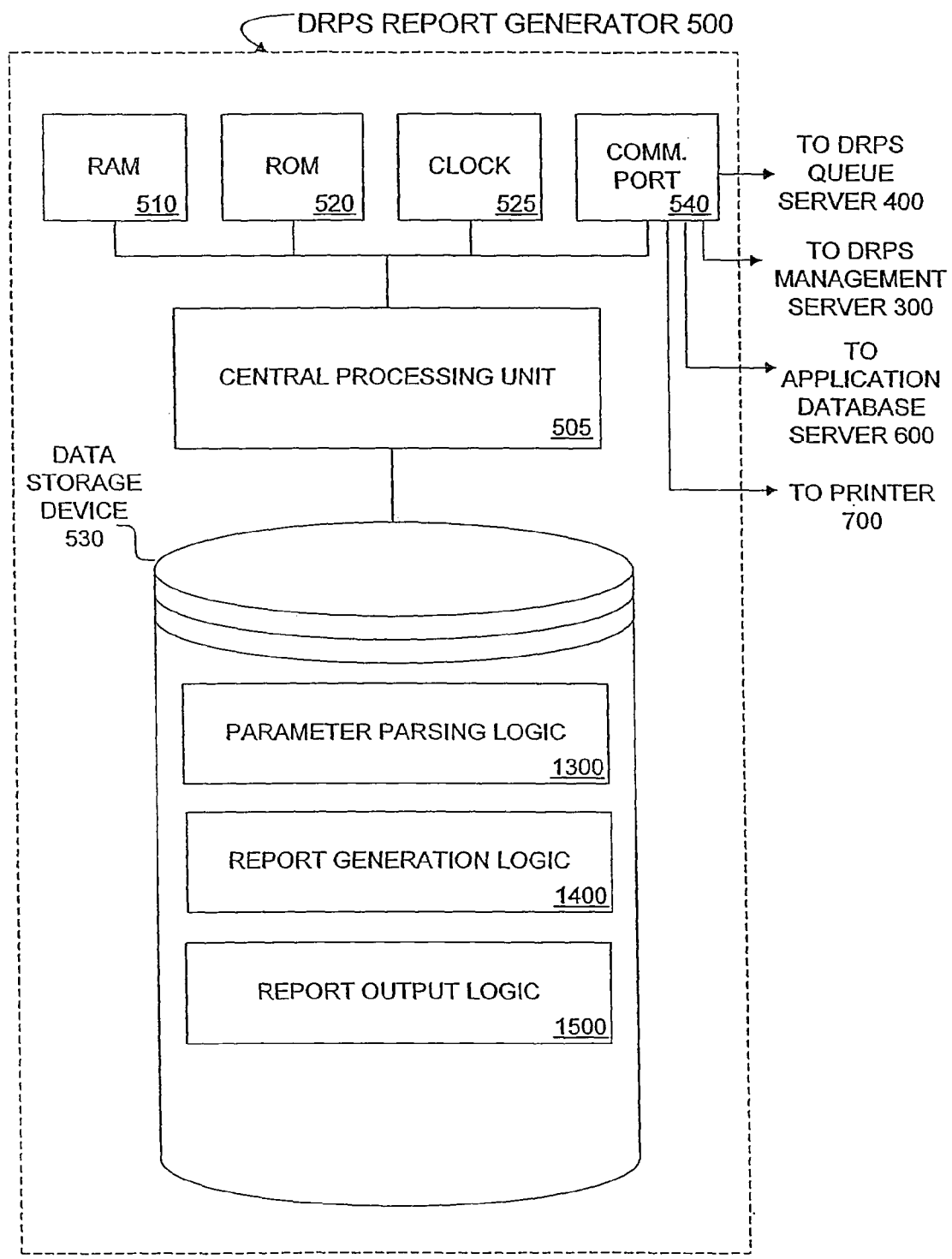
FIG. 5 is a schematic block diagram of an embodiment of the DRPS report generator 500 of FIG. 1.

With reference to FIGS. 3, 4 and 5 and with continuing reference to FIG. 1, the DRPS 100 includes the DRPS management server 300, the DRPS queue server 400 and multiple DRPS report generators 500. In an alternate embodiment, the functions of each server may be combined or distributed over more than one processor or server device using, for example, clustering, load balancing, replication, distributed processing or message queuing techniques.

Figure 2:
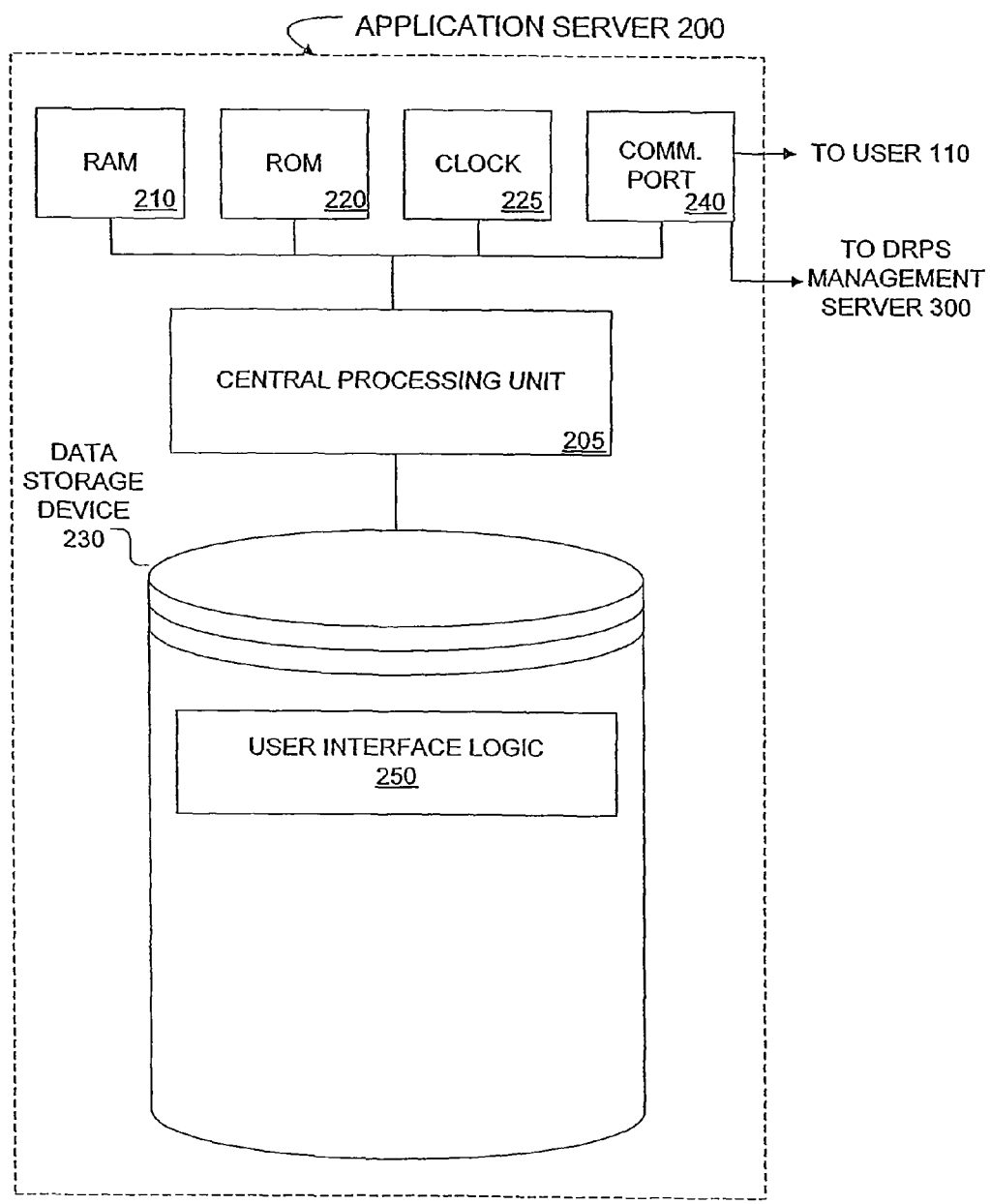
FIG. 2 is a schematic block diagram of an embodiment of the application server 200 of FIG. 1.
Figure 6:
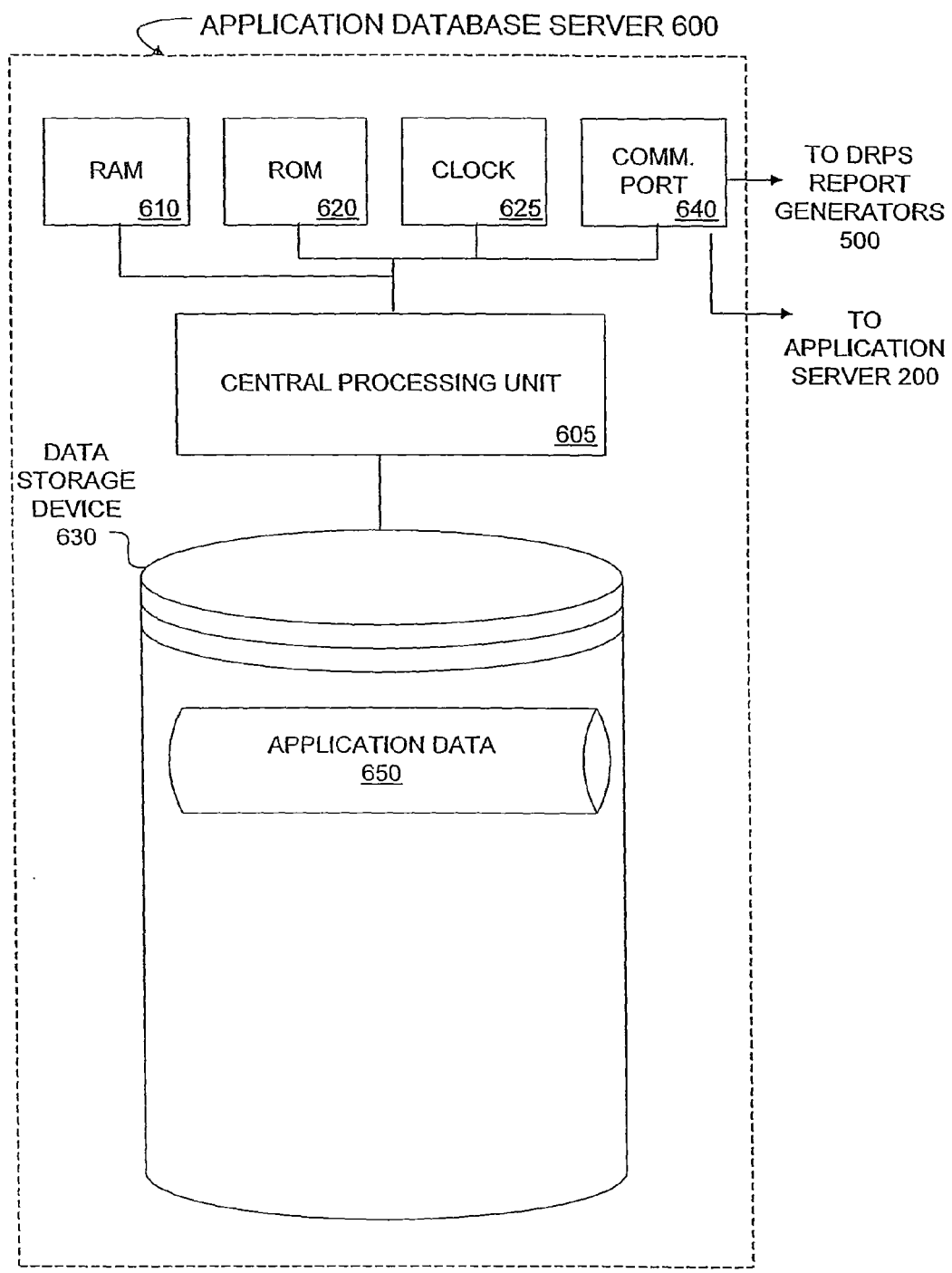
FIG. 6 is a schematic block diagram of an embodiment of the application database server 600 of FIG. 1.

With reference to FIG. 2 and FIG. 6 and with continuing reference to FIG. 1, the DRPS 100 is integrated with the external application server 200 and the external application database server 600. As used herein, the term "database server" is used to denote either a single database server or multiple database servers. In an alternate embodiment, the application server 200, the application database server 600 and the DRPS 100 may be located at separate physical locations for security, availability or other reasons. In either embodiment, data communications between servers may be maintained through private or public networks.

FIG. 3 is a block diagram showing the architecture of an embodiment of the DRPS management server 300. The DRPS management server 300 stores, for example, system logic that formats incoming report requests and submits them to the DRPS queue server 400 for distribution. The DRPS management server 300 also stores pre-configured report and report package requests that are to be run automatically at a future scheduled date, such as month-end or year-end. When the report request parameters require the reports to be stored for later retrieval, the DRPS management server 300 also stores completed reports and corresponding database information.

The DRPS management server 300 includes certain hardware components, including a central processing unit (CPU) 305, random-access memory (RAM) 310, read-only memory (ROM) 320, a clock 325, a data storage device 330 and a communications port 340. The CPU 305 is linked to each of the other listed elements by, for example, means of a shared data bus or by dedicated connections as shown in FIG. 3.

The CPU 305 may be embodied as a single commercially available processor, such as an Intel Pentium III microprocessor, Motorola G4 microprocessor, Sun Microsystems Ultrasparc microprocessor or a similar microprocessor. Alternatively, the CPU 305 may be embodied as a number of such processors operating in parallel.

The ROM 320 and/or the data storage device 330 are operable to store one or more instructions, which the CPU 305 is operable to retrieve, interpret, and execute. For example, the ROM 320 and/or the data storage device 330 store instructions to perform the processing of input from user 110 and create numerous calculations and other operations to return a display to user 110.

The CPU 305 may include a control unit, an arithmetic logic unit (ALU) and a CPU local memory storage device such as a stackable cache or a plurality of registers in a known manner. The control unit (not shown) is operable to retrieve instructions from the data storage device 330 or the ROM 320. The ALU (not shown) is operable to perform a plurality of operations needed to carry out instructions. The CPU local memory storage device (not shown) is operable to provide high-speed storage used for storing temporary results and control information.

As discussed further hereinbelow in conjunction with FIGS. 7, 8, 13, and 14 respectively, the data storage device 330 includes report request generation logic 1000, report request submission logic and queue interface 1100, request storage 1600, and report storage 1700, stored as programs or other instructions.

The communications port 340 connects the DRPS management server 300 over networks to multiple sources, including the external application server 200 and the DRPS queue server 400.

FIG. 4 is a block diagram showing the architecture of an embodiment of the DRPS queue server 400. The DRPS queue server 400 includes certain standard hardware components, such as a central processing unit (CPU) 405, random access memory (RAM) 410, read only memory (ROM) 420, a clock 425, a data storage device 430 and a communications port 440. Each of these components may be identical to those described above in conjunction with FIG. 3. The communications port 440 connects the DRPS queue server 400 to the DRPS management server 300 and multiple report generators 500.

As discussed further hereinbelow in conjunction with FIG. 9, the data storage device 430 includes message queue logic 1200 that accepts incoming report request parameter files and distributes them to multiple DRPS report generators 500. In one embodiment, the message queue logic 1200 notifies all waiting DRPS report generators 500 that one or more requests have arrived in the queue. In this embodiment, a single DRPS report generator 500 will respond first to the notification, based on best availability of processing capacity or other criteria, and will pull a report request from the queue and generate the report. In an alternate embodiment, multiple DRPS report generators 500 can generate reports simultaneously to decrease the overall processing time for the multiple reports.

FIG. 5 is a block diagram showing the architecture of an embodiment of the DRPS report generator 500. Each DRPS report generator 500 includes certain standard hardware components, such as a central processing unit (CPU) 505, random access memory (RAM) 510, read only memory (ROM) 520, a system clock 525, a data storage device 530 and a communications port 540. Each of these components may be identical to those described above in conjunction with FIG. 3. The communications port 540 connects the DRPS report generator 500 to the DRPS queue server 400, the external application database server 600, the DRPS management server 300 and one or more printers 700.

As discussed further hereinbelow in conjunction with FIGS. 10-12 respectively, the data storage device 530 includes parameter parsing logic 1300, report generation logic 1400 and report output logic 1500. The DRPS report generators 500 pull or receive the report request parameters from the DRPS queue server 400, parse the requests and use those instructions to retrieve data from application database server 600 and create the report using the report generation logic 1400. Using instructions in a parameter file, the report output logic 1500 may combine multiple reports into a package. The report output logic 1500 may also format the report or report package for display by user 110 or for direct printing to one or more printers 700.

FIG. 2 is a block diagram showing the architecture of an embodiment of the application server 200. The application server 200 includes certain standard hardware components, such as a central processing unit (CPU) 205, random access memory (RAM) 210, read only memory (ROM) 220, a clock 225, a data storage device 230 and a communications port 240. Each of these components may be identical to those described above in conjunction with FIG. 3. The communications port 240 connects the application server 200 to the DRPS management server 300 and to multiple users 110 over networks. The data storage device 230 includes user interface logic 250 that enables user 110 to interact with the server 300 to perform functions such as requesting reports and transmitting reports to users for display and printing.

FIG. 6 is a block diagram showing the architecture of an embodiment of the application database server 600. Each application database server 600 includes certain standard hardware components, such as a central processing unit (CPU) 605, random access memory (RAM) 610, read only memory (ROM) 620, a clock 625, a data storage device 630 and a communications port 640. Each of these components may be identical to those described above in conjunction with FIG. 3. The communications port 640 connects the application database server 600 to the DRPS report generators 500 and to the application server 200 over networks. The data storage device 630 includes application data 650 that can be used in the generation reports. For example, an illustrative portfolio management system may be run on the application server 200. The data, including account holdings and prices, may be stored on the application database server 600.

Operation

Figure 7:
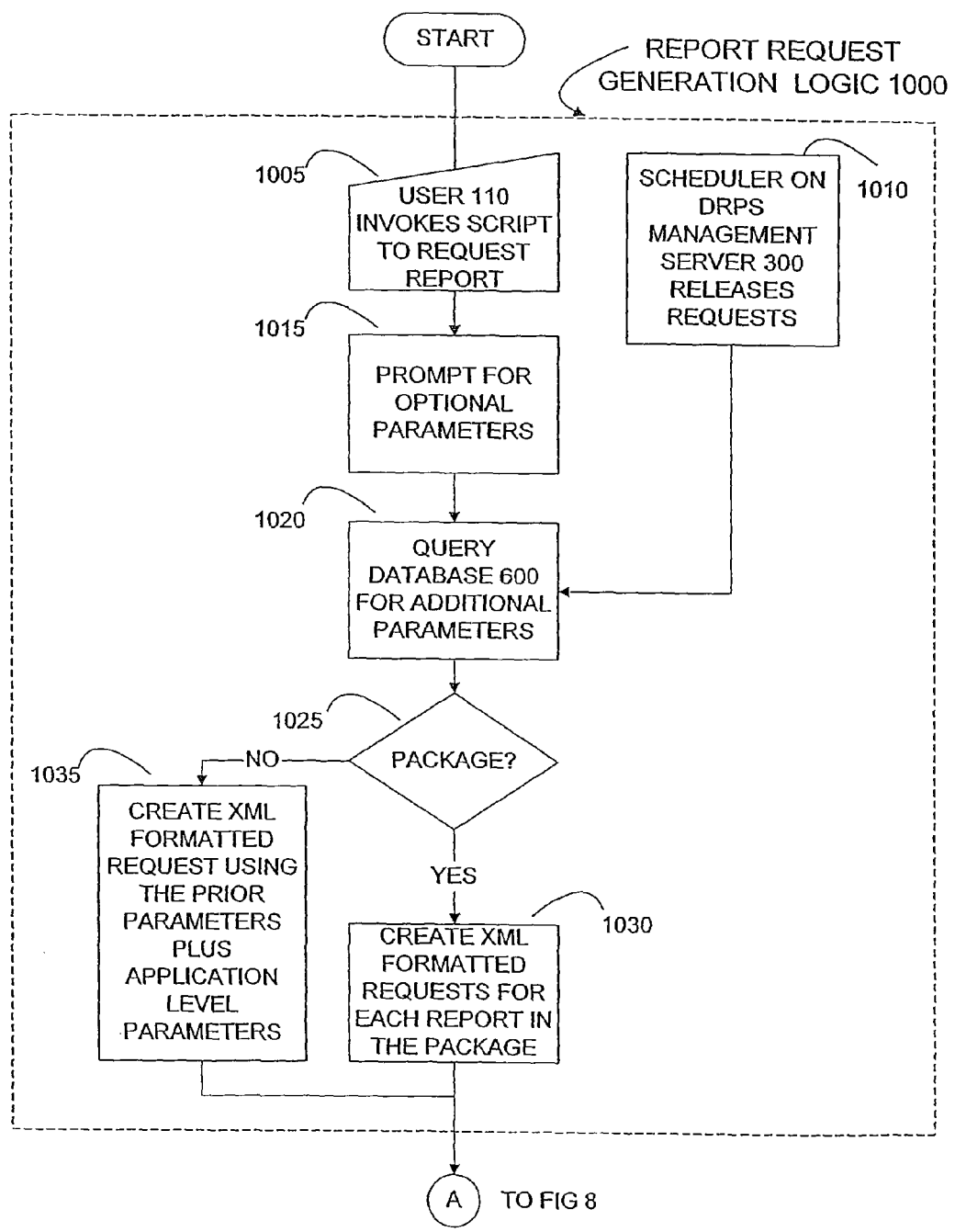
FIG. 7 is a flowchart illustrating an embodiment of report request generation logic 1000 from the DRPS management server 300.

With reference to FIG. 7 and reference back to FIG. 3, the report request generation logic 1000 accepts report requests from the application server 200 and creates parameters in a separate file or message for each report that can be transmitted to the DRPS queue server 400. In one embodiment, the parameters can be formatted in extensible markup language (XML) that can be parsed by the report generator 500 that pulls the XML request file from the queue. In another embodiment of the report request generation logic 1000, the parameters are created and are stored in the request storage 1600 to automatically release on some future date specified in the parameters.

The process starts when user 110 invokes a program through the application server 200 to request a report or a package of reports as shown in step 1005. User 110 may optionally be prompted for additional parameters that relate to the report or package of reports being requested in step 1015. For example, the user may choose a parameter to eliminate graphics from a report or add a table of contents to a report package. In addition, user 110 may be prompted to query the application database server 600 for additional parameters as shown in step 1020. These parameters could include the selection of accounts as discussed previously in the portfolio management application example. A determination is made whether the report request is for a single report or a report package as shown in step 1025.

If the request is for a single report, step 1035 is performed to create a formatted request file using the previously described input parameters and application level parameters. The report request generation logic 1000 is completed and the process continues to report request submission and queue interface logic 1100.

If the determination in step 1025 indicates a report package, multiple formatted request files are generated for each report in the package, each containing a reference that it is part of the overall report package. The report request generation logic 1000 is completed and the process proceeds to report request submission and queue interface logic 1100 in FIG. 8.

Figure 8:
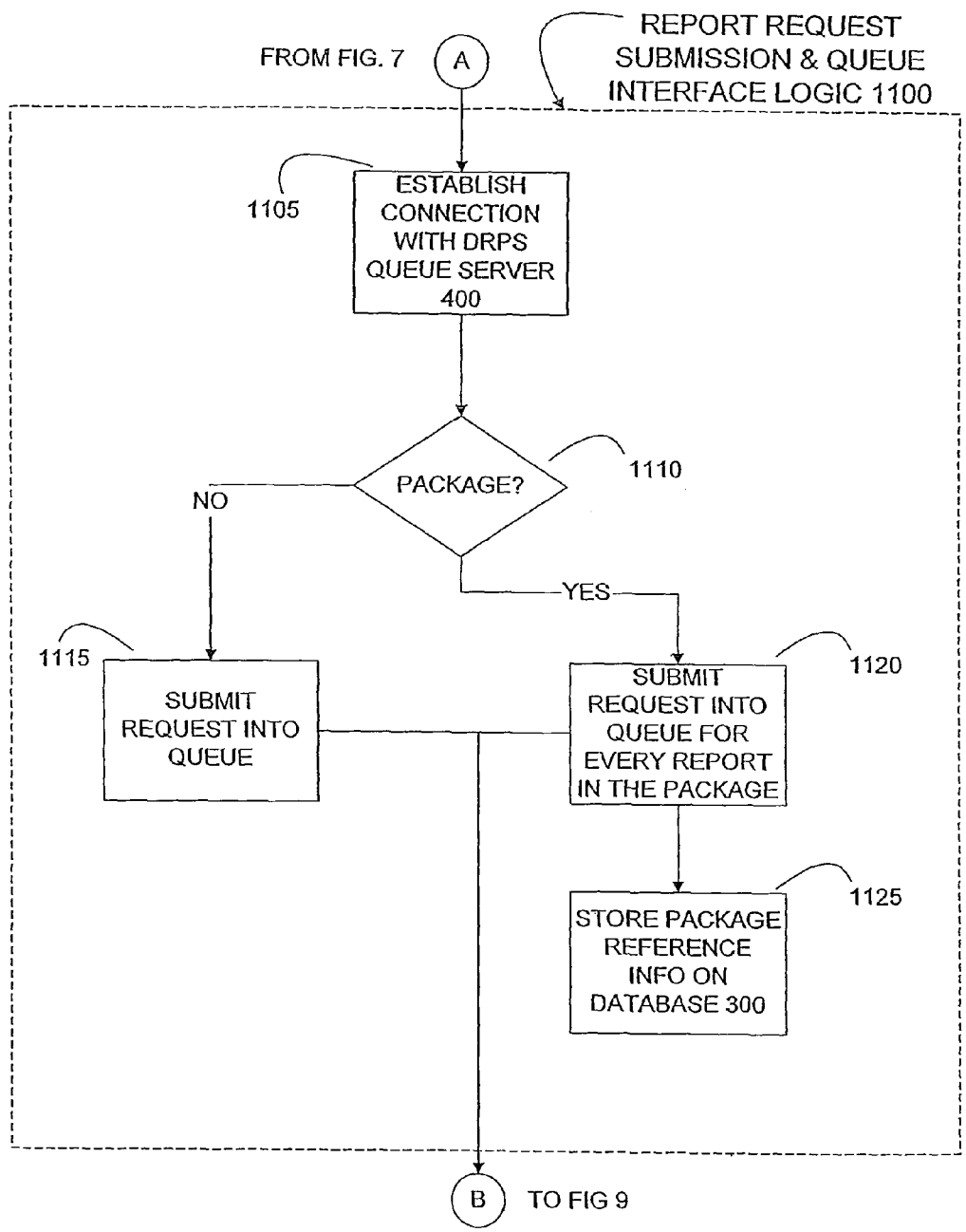
FIG. 8 is a flowchart illustrating an embodiment of report request submission and queue interface logic 1100 from the DRPS management server 300.

With reference to FIG. 8 and ongoing reference to FIG. 3, the formatted request files are submitted to the queue interface handled by the DRPS queue server 400. The process in FIG. 8 starts after the report request generation logic 1000 is completed in FIG. 7. In step 1105, an authenticated connection is established with the DRPS queue server 400 and a determination is made in step 1110 whether the request is for a single report or a report package.

If the request is for a single report, the request is submitted into the queue as shown in step 1115. If the determination in step 1110 indicates a report package, requests are submitted into the queue for each report in the package as shown in step 1120. The information about the package, including the generated report number, the identity of user 110 and other information is stored in the DRPS management server 300 in step 1125. Report request submission and queue interface logic 1100 is completed and the process proceeds to the message queue logic 1200 in FIG. 9.

Figure 9:
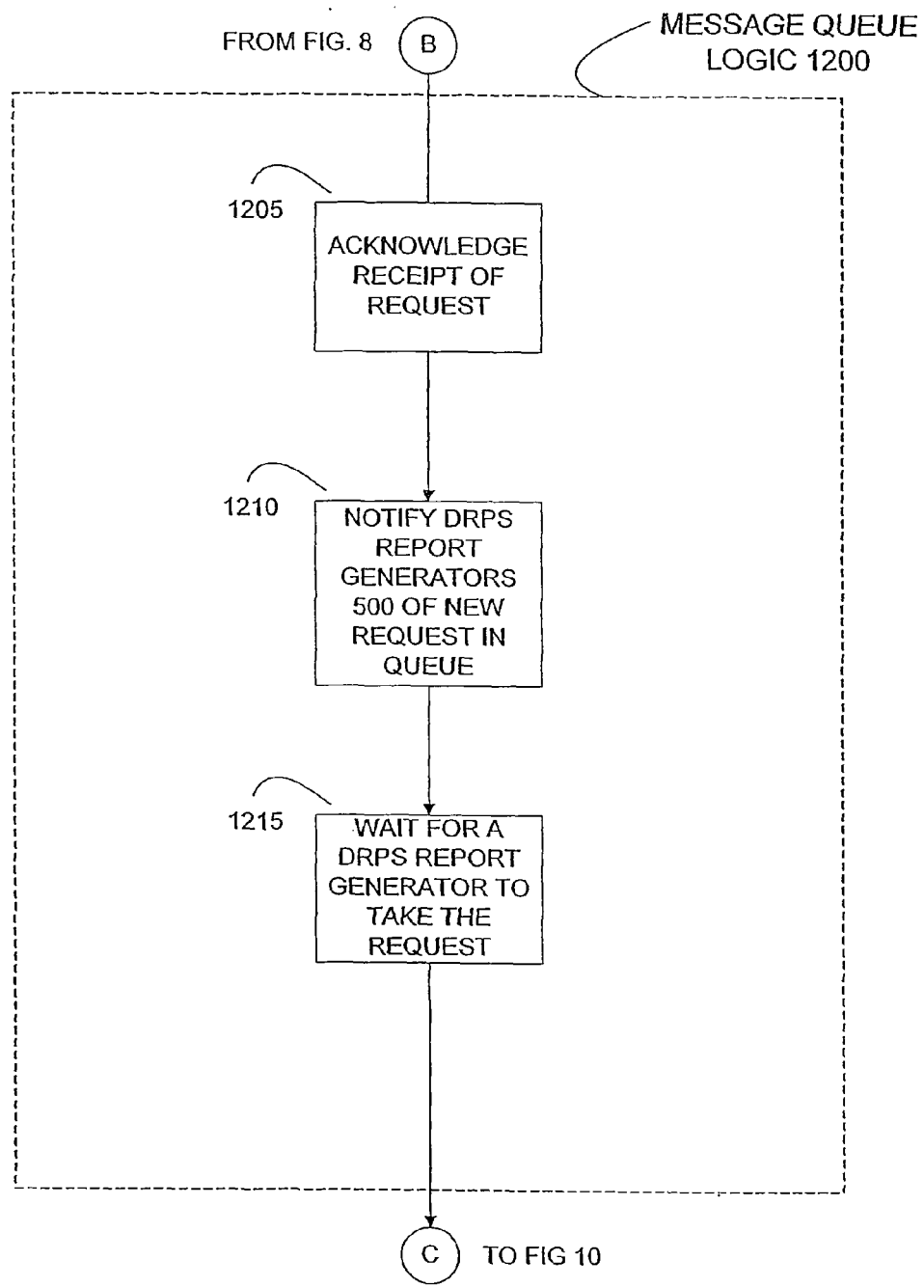
FIG. 9 is a flowchart illustrating an embodiment of message queue logic 1200 from the DRPS queue server 400.

With reference to FIG. 9 and reference back to FIG. 4, the message queue logic 1200 is used to handle the report request parameter files submitted to the queue as illustrated in FIG. 8. In step 1205, the DRPS queue server 400 acknowledges receipt of the request or multiple requests from the DRPS management server 300 and notifies the DRPS report generators 500 of the new request or multiple requests in the queue in step 1210.

The DRPS queue server waits until each request is pulled from the queue by a DRPS report generator 500 until the queue is empty as shown in step 1215. The message queue logic 1200 is completed and the process proceeds to the parameter parsing logic 1300 in FIG. 10.

Figure 10:
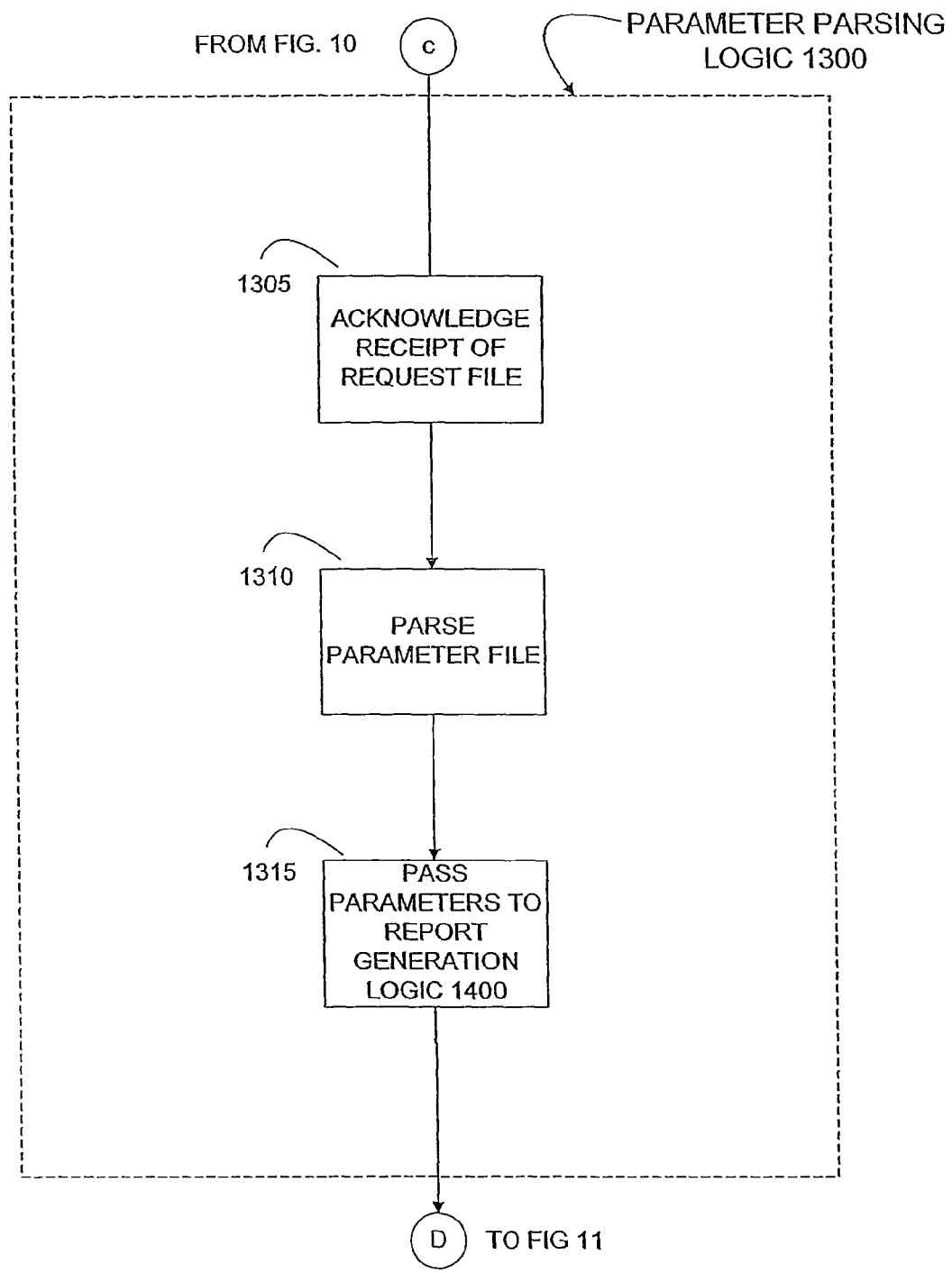
FIG. 10 is a flowchart illustrating an embodiment of parameter parsing logic 1300 from the DRPS report generator 500.

With reference to FIG. 10 and reference back to FIG. 5, the parameter parsing logic 1300 is used to interpret the report request files received from the DRPS queue server 400. In step 1305, a DRPS report generator 500 acknowledges receipt of the request file from the DRPS queue server 400. In step 1310, the report request parameter file is parsed into memory and in step 1315 those parameters are passed to the next process, the report generation logic 1400, in FIG. 11.

Figure 11:
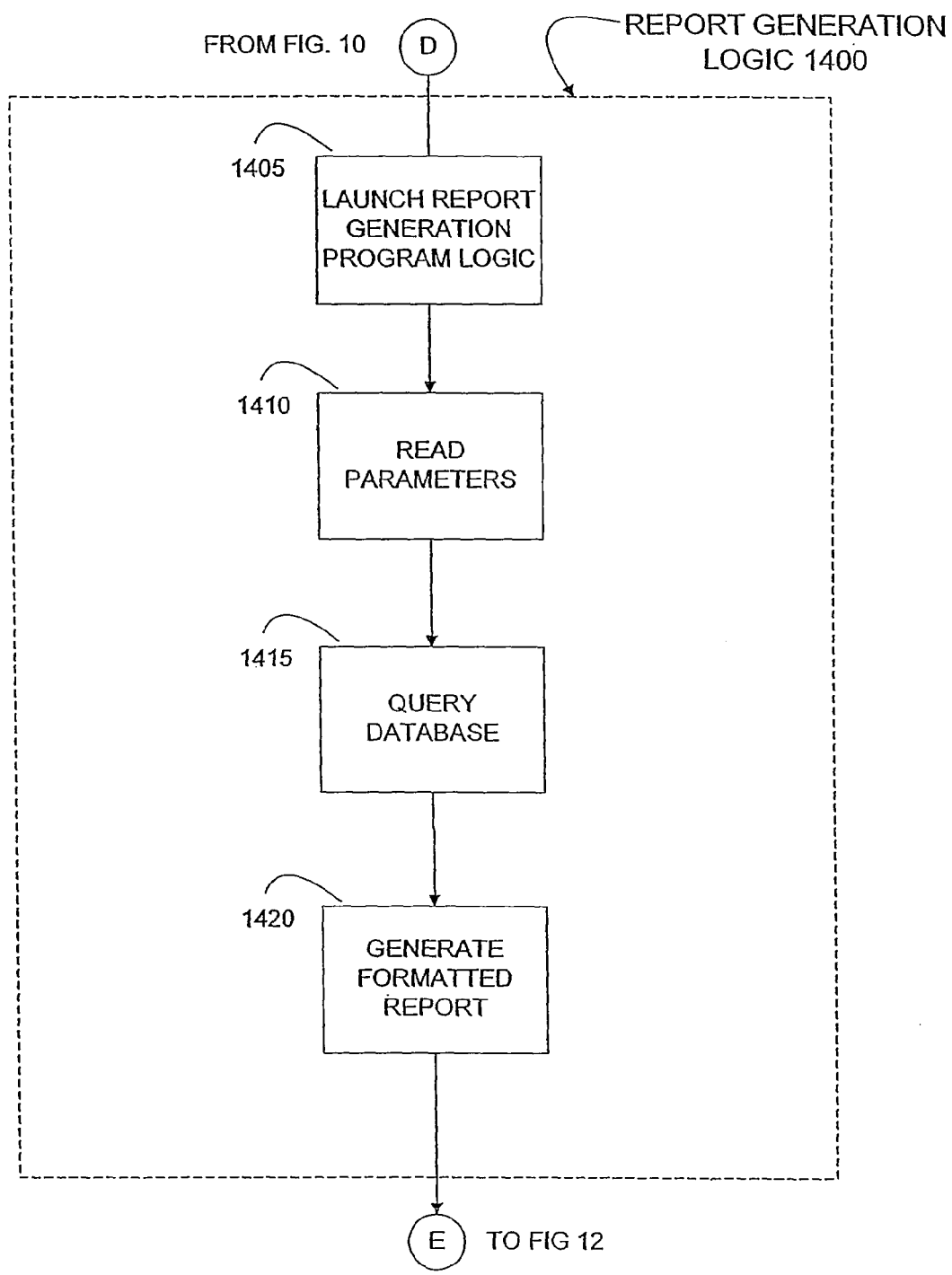
FIG. 11 is a flowchart illustrating an embodiment of report generation logic 1400 from the DRPS report generator 500.

With reference to FIG. 11 and reference back to FIG. 5, the DRPS report generators 500 use the parsed report request parameters to generate the reports according to the specified parameters. In step 1405, the report generation programs are launched or executed and the report request parameters are read into the program in step 1410.

In step 1415, the application database 600 is queried to retrieve information specified in the report request parameter file and the combination of the input parameters and database information is used to generate the formatted report in step 1420. Report generation logic 1400 is completed and the process proceeds to the report output logic 1500 in FIG. 12.

Figure 12:
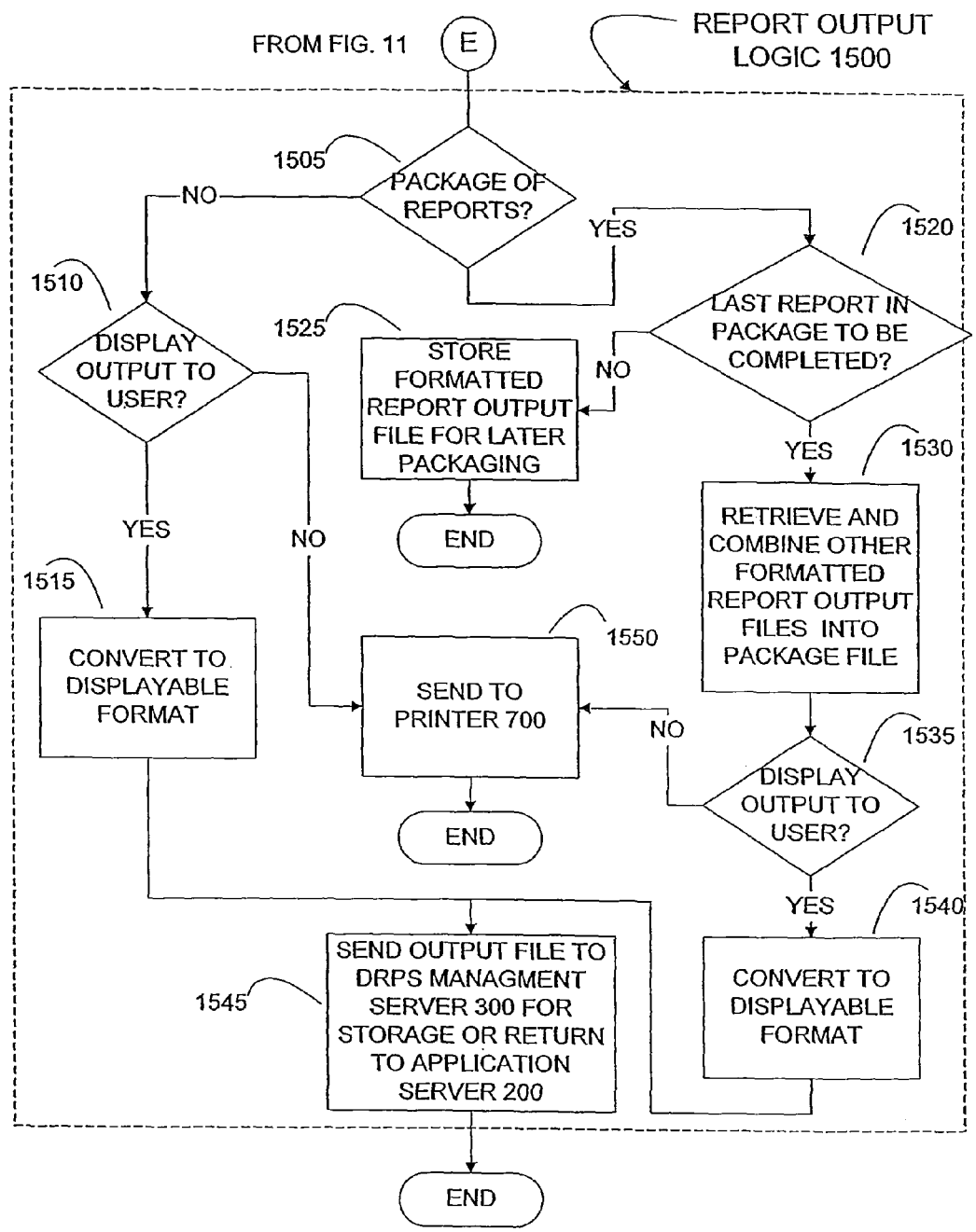
FIG. 12 is a flowchart illustrating an embodiment of report output logic 1500 from the DRPS report generator 500.

With reference to FIG. 12 and reference back to FIG. 5, the DRPS report generators 500 send the output in the format and to the destination specified in the report request parameter file. In step 1505, a determination is made whether the previously created report is a single report or part of a report package.

If the determination indicates that it is a single report, step 1510 is performed to further determine whether the report will be displayed to user 110 as specified in the report request parameters or stored for later display. If this determination indicates that the report is not to be displayed, the report is formatted for transmission to the printer 700 and the process ends. If the determination indicates that the report will be displayed to user 110, the report format is converted to the displayable format specified in the report request parameters and is returned to the DRPS management server 300 for subsequent display to user 110 through the application server 200.

If the determination in step 1510 indicates that the report is part of a report package, another determination is made in step 1520 whether the report is the last report in the package to be processed. If the determination indicates that it is not the last report to be processed, the report output is stored for later retrieval in step 1525 until the last report output file is completed. If the determination in step 1520 indicates that it is the last report in a report package, step 1530 is performed to retrieve all of the other report files that are part of the report package and combine those files with the last report file to create a report package file.

In step 1535, a determination is made whether the report package will be displayed, including storage for later display. If the determination indicates that the report package will not be displayed, the report package is formatted and transmitted to the printer 700 and the process ends. If the determination in step 1535 indicates that the report package will be displayed, the report package format is converted to the displayable format specified in the report request parameters in step 1540. The output file is returned to the DRPS management server 300 in step 1545 for storage or display to user 110 through the application server 200.

Data Storage

With reference to FIG. 13 and reference back to FIG. 3, a request storage 1600 database or file structure preferably stores report request parameters and other information for a report request or report package request that can be used to automatically generate the report or report package at a future date. Request storage 1600 maintains a plurality of records, such as records 1605-1625, each associated with an individual report request or an individual report within a report package request.

The request ID#1630, report ID#1635, and user ID#1640 fields are used in combination to uniquely identify each record and may be utilized, for example, to identify a user 110 who created the stored request. A next run date 1645 field is used to determine the next date on which the report or report package will be automatically generated without additional input from user 110.

Another embodiment of next run date field 1645 stores a report cycle, such as month-end, on which the report would be repetitively run in the future. A run-time parameters 1650 field is used to store the report request parameters that are used when the report is generated. A report package name 1655 field is used to store the name created by user 110 for the stored report or report package request.

With reference to FIG. 14 and ongoing reference to FIG. 3, a report package storage 1700 database or file structure stores information regarding completed report packages where the report request parameter file specified that the report or report package output files were to be stored for later retrieval. Report package storage 1700 maintains a plurality of records, such as records 1705-1725, each associated with an individual report output file or a report package output file.

A package ID#1730 field is used to store a unique identifier for each stored report or report package. A creation date 1735 field is used to store the as-of date that indicates when the report was generated. A user ID#1640 field is used to store the identity of the user 110 who input the report request. A name 1745 field is used to store the name created by user 110 for the stored report or report package output file. A file location 1750 field is used to store the relative file path or file location of the stored report, including the output filename.

The invention has been described with reference to various embodiments. Obvious modifications and alterations will occur to those of ordinary skill in the art upon reading and understanding the preceding detailed description. It is intended that the invention be construed as including all such modifications and alterations insofar as they come within the scope of the appended claims or the equivalents thereof.

What is claimed is:

1. A distributed report processing system, comprising:
    a management server configured to receive an electronic request from an application server and to generate a plurality of report requests, wherein the application server is configured to permit a user to configure at least one report request parameter including customizing a graphical feature of a report, adding a table of contents to a report package, selecting an account, setting a date on which a report is scheduled to run, requesting a single report, or requesting a report package;
    a queue server in electronic communication with the management server, wherein the queue server is configured to receive the plurality of report requests;
    a plurality of report generators in electronic communication with the management server and the queue server, wherein the report generators are configured to pull the plurality of report requests from the queue server in accordance with report generation logic including at least one parameter formatted in an XML-equivalent structured data format configured for parsing by the report generators, wherein the report generators are configured in a distributed arrangement such that the report generators create a plurality of formatted output reports in parallel, wherein the formatted output reports are in at least one electronic file, wherein the report generators are commonly connected to one or more central processing units and each of the report generators is configured to operate independently of the other report generators to generate reports simultaneously with the other report generators, and wherein the management server stores the formatted output reports; and
    at least one memory device operatively associated with at least one of the management server, the queue server, or the plurality of report generators.

2. The system of claim 1, wherein the queue server includes a data storage device having message queue logic.

3. The system of claim 1, wherein each of the report generators includes a data storage device having parameter parsing logic, report generation logic, and report output logic.

4. The system of claim 1, wherein at least one of the report generators is adapted for communication with an application database server.

5. The system of claim 1, wherein the management server is adapted to communicate with an application database server.

6. A system, comprising:
an application server configured to permit a user to configure at least one report request parameter including customizing a graphical feature of a report, adding a table of contents to a report package, selecting an account, setting a date on which a report is scheduled to run, requesting a single report, or requesting a report package; and
a distributed report processing system in electronic communication with the application server, the distributed report processing system including:
a management server configured to receive an electronic request from the application server and to generate a plurality of report requests;
a queue server in electronic communication with the management server, wherein the queue server is configured to receive the plurality of report requests;
a plurality of report generators in electronic communication with the management server and the queue server, wherein the report generators are configured to receive at least one of the plurality of report requests, wherein the report generators are configured in a distributed arrangement such that the report generators create a plurality of formatted output reports in parallel, wherein the report generators are configured to pull the plurality of report requests from the queue server in accordance with report generation logic including at least one parameter formatted in an XML-equivalent structured data format configured for parsing by the report generators, wherein the formatted output reports are in at least one electronic file, wherein the report generators are commonly connected to one or more central processing units, and wherein the management server stores the formatted output reports; and
at least one memory device operatively associated with at least one of the management server, the queue server, or the plurality of report generators.

7. The system of claim 6, further comprising an application database server in electronic communication with the application server and the distributed report processing system.

8. The system of claim 6, wherein each of the report generators includes a data storage device having parameter parsing logic, report generation logic, and report output logic.

9. The system of claim 6, wherein the management server includes a data storage device having report request generation logic, report request submission and queue interface logic, request storage, and report storage.

10. A distributed report processing system, comprising:
a management server configured to receive an electronic request from an application server and to generate a plurality of report requests, wherein the application server is configured to permit a user to configure at least one report request parameter including customizing a graphical feature of a report, adding a table of contents to a report package, selecting an account, setting a date on which a report is scheduled to run, requesting a single report, or requesting a report package;
a queue server in electronic communication with the management server, wherein the queue server is configured to receive the plurality of report requests;
a plurality of report generators in electronic communication with the management server and the queue server, wherein the report generators are configured to pull the plurality of report requests from the queue server in accordance with report generation logic including at least one parameter formatted in an XML-equivalent structured data format configured for parsing by the report generators, wherein the report generators are configured in a distributed arrangement such that the report generators create a plurality of formatted output reports in parallel, wherein the formatted output reports are in at least one electronic file, wherein the report generators are commonly connected to one or more central processing units and each of the report generators is configured to operate independently of the other report generators to generate reports simultaneously with the other report generators, wherein the report generators are connected to a common data storage device, and wherein the management server stores the formatted output reports; and
at least one memory device operatively associated with at least one of the management server, the queue server, or the plurality of report generators.

11. The system of claim 10, wherein the queue server includes a data storage device having message queue logic.

12. The system of claim 10, wherein the common data storage device includes parameter parsing logic, report generation logic, and report output logic.

13. The system of claim 10, wherein at least one of the report generators is adapted for communication with an application database server.

14. The system of claim 10, wherein the management server is adapted to communicate with an application database server.

15. A system, comprising:
an application server configured to permit a user to configure at least one report request parameter including customizing a graphical feature of a report, adding a table of contents to a report package, selecting an account, setting a date on which a report is scheduled to run, requesting a single report, or requesting a report package; and
a distributed report processing system in electronic communication with the application server, the distributed report processing system including:
a management server configured to receive an electronic request from the application server and to generate a plurality of report requests;
a queue server in electronic communication with the management server, wherein the queue server is configured to receive the plurality of report requests;
a plurality of report generators in electronic communication with the management server and the queue server, wherein the report generators are configured to receive at least one of the plurality of report requests, wherein the report generators are configured in a distributed arrangement such that the report generators create a plurality of formatted output reports in parallel, wherein the report generators are configured to pull the plurality of report requests from the queue server in accordance with report generation logic including at least one parameter formatted in an XML-equivalent structured data format configured for parsing by the report generators, wherein the formatted output reports are in at least one electronic file, wherein the report generators are commonly connected to one or more central processing units, wherein the report generators are connected to a common data storage device, and wherein the management server stores the formatted output reports; and at least one memory device operatively associated with at least one of the management server, the queue server, or the plurality of report generators.

16. The system of claim 15, further comprising an application database server in electronic communication with the application server and the distributed report processing system.

17. The system of claim 15, wherein the common data storage device includes parameter parsing logic, report generation logic, and report output logic.

18. The system of claim 15, wherein the management server includes a data storage device having report request generation logic, report request submission and queue interface logic, request storage, and report storage.

* * * * *